July 8, 1958 A. W. SHAW ET AL 2,842,238
POWER-OPERATED PIPE CUTTING TOOL
Filed May 18, 1956 5 Sheets-Sheet 1

INVENTORS
ALBERT W. SHAW,
FRANK L. CLAIRE,
RUSSELL J. BULLARD, (DECEASED)
DOROTHY E. BULLARD, ADMINISTRATRIX,
BY

McMorrow, Berman & Davidson
ATTORNEYS.

July 8, 1958

A. W. SHAW ET AL 2,842,238

POWER-OPERATED PIPE CUTTING TOOL

Filed May 18, 1956

INVENTORS
ALBERT W. SHAW,
FRANK L. CLAIRE,
RUSSELL J. BULLARD, (DECEASED)
DOROTHY E. BULLARD, ADMINISTRATRIX,
BY

McMorrow, Berman + Davidson
ATTORNEYS.

July 8, 1958

A. W. SHAW ET AL 2,842,238

POWER-OPERATED PIPE CUTTING TOOL

Filed May 18, 1956

INVENTORS.
ALBERT W. SHAW,
FRANK L. CLAIRE,
RUSSELL J. BULLARD, (DECEASED)
DOROTHY E. BULLARD, ADMINISTRATRIX,
by McMorrow, Berman & Davidson
ATTORNEYS.

July 8, 1958     A. W. SHAW ET AL     2,842,238
POWER-OPERATED PIPE CUTTING TOOL
Filed May 18, 1956     5 Sheets-Sheet 5
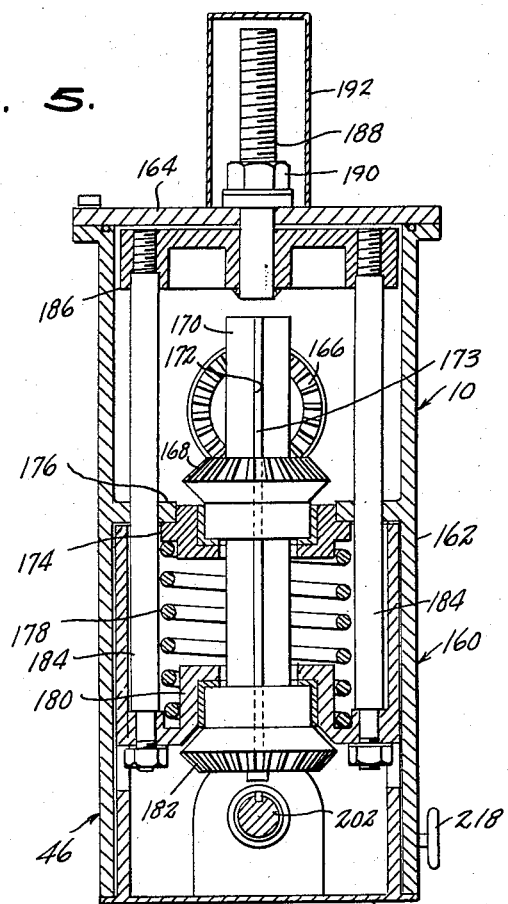
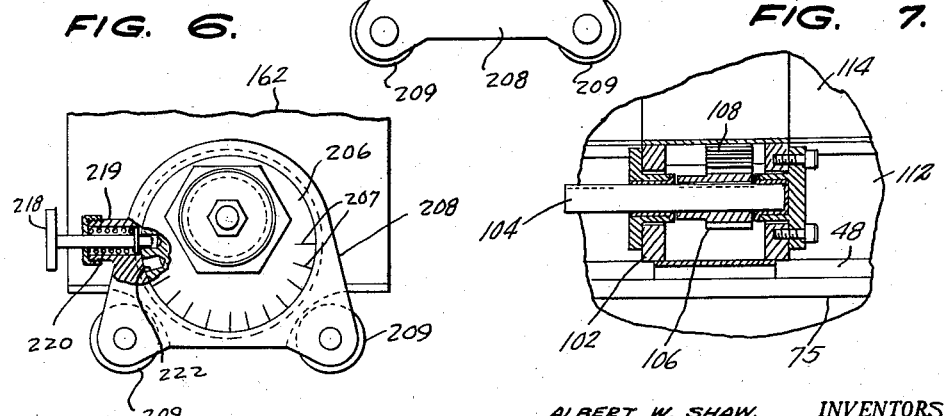
ALBERT W. SHAW,
FRANK L. CLAIRE,
RUSSELL J. BULLARD, (DECEASED)
DOROTHY E. BULLARD, ADMINISTRATRIX,
INVENTORS
BY McMorrow, Berman & Davidson
ATTORNEYS.

United States Patent Office 2,842,238
Patented July 8, 1958

2,842,238
POWER-OPERATED PIPE CUTTING TOOL

Albert W. Shaw, Whittier, and Frank L. Claire, Taft, Calif., and Russell J. Bullard, deceased, late of Taft, Calif., by Dorothy E. Bullard, administratrix, Taft, Calif.

Application May 18, 1956, Serial No. 585,785

4 Claims. (Cl. 90—12)

This invention relates to pipe cutting machines, and more particularly has reference to an improved machine, constituting a novel improvement of the apparatus shown in our Patent No. 2,561,484.

Summarized briefly, the present invention includes a clamp assembly of sectionally constituted or split formation, adapted to be placed about a length of pipe to be cut. The device is intended for use on large diameter pipes, such as 12-inch or 14-inch pipes, or even pipes of substantially greater diameters than those named. The clamp assembly when secured fixedly about the pipe, provides a trackway, and mounted upon said trackway is a carriage, which is self-propelled and has a floating cutting head spring-biased radially of the pipe, into engagement with the pipe. Accordingly, on travel of the carriage through the full circumference of the clamping ring, a circumferential cut is made in the pipe, and continued travel of the carriage about the pipe eeffcts a full severing of the pipe at the desired location. The construction is such that the carriage is removably mounted upon the clamp assembly, and accordingly, any of a plurality of different clamp assemblies, each sectionally constituted so as to be capable of being fitted about a "live line" or string of pipe, can be used in association with a single carriage, according to the diameter of the pipe to be cut. Each pipe assembly, in this regard, is designed to fit about pipes falling within a predetermined range of diameters, as for example one clamp assembly is usable on 12-inch and 14-inch pipe, another is usable on 16 and 18-inch pipe, etc.

The broad object of the present invention is to provide a pipe-cutting assembly adapted for heavy duty pipe-cutting operations on large diameter pipes, with said assembly to be characterized by its ease of installation upon a pipe, by its efficient cutting action, and by its adaptability for cutting pipes of different diameters through the interchanging of pipe assemblies any of which can support a single self-propelled carriage.

Other objects will appear from the following description, the claims appended thereto, and from the annexed drawing, in which like reference characters designate like parts throughout the several views, and wherein:

Figure 4 is a longitudinal sectional view through the machine on the same scale as Figure 3, taken on line 4—4 of Figure 1;

Figure 5 is an enlarged longitudinal sectional view through the head taken on line 5—5 of Figure 2;

Figure 2:
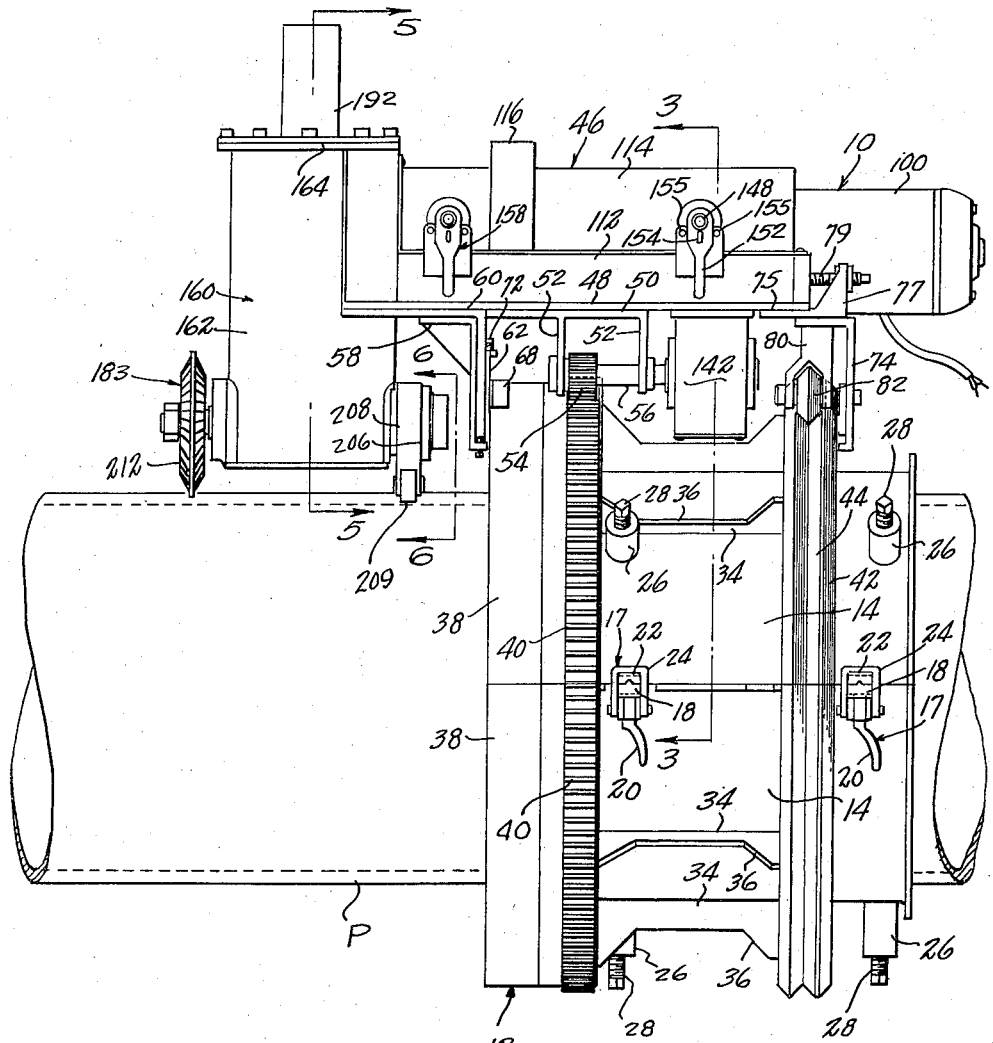
Figure 2 is a side elevational view of the machine upon the pipe being cut.
Figure 3:
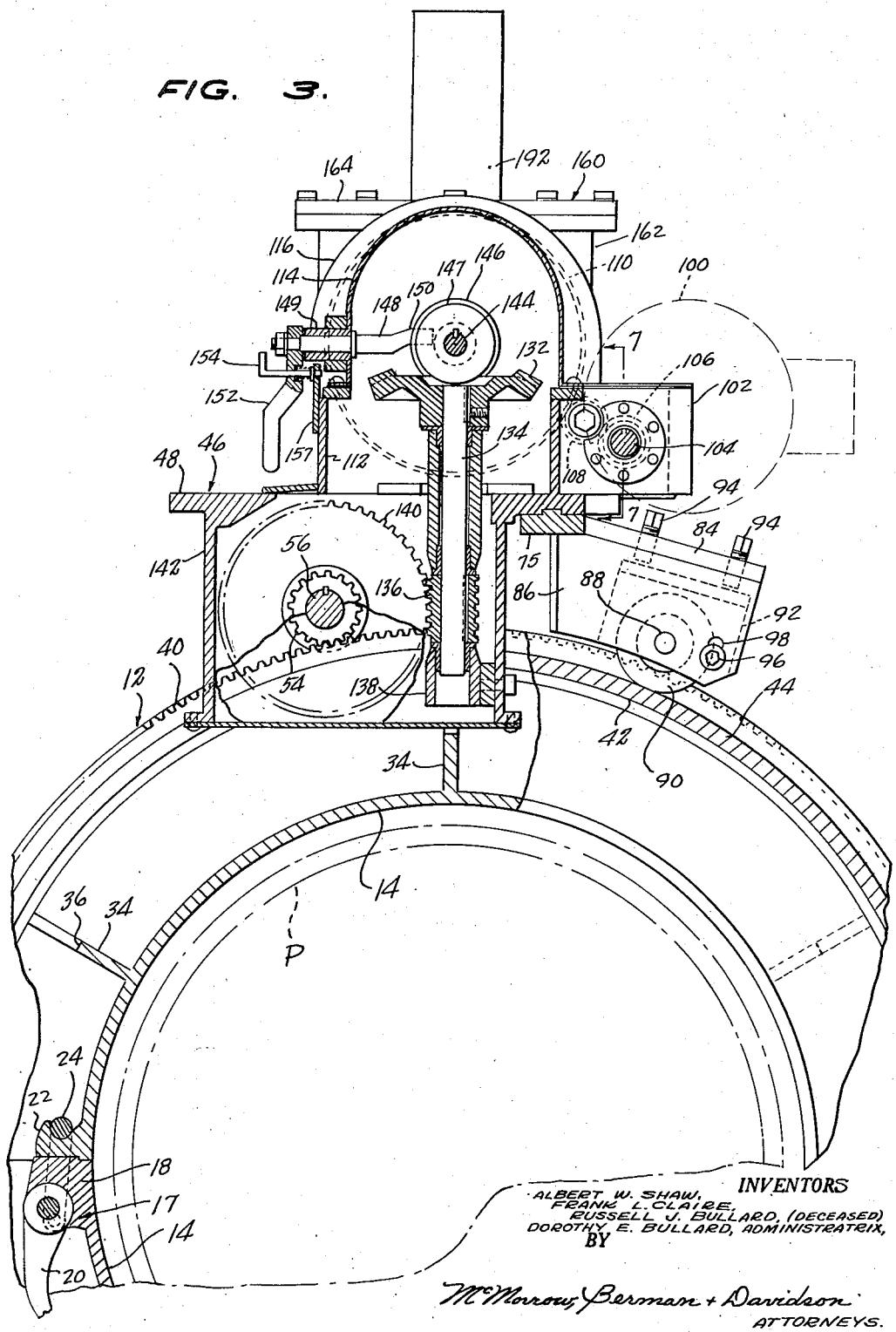
Figure 3 is an enlarged transverse sectional view on line 3—3 of Figure 2.

Figure 6 is an enlarged detail sectional view on line 6—6 of Figure 2, showing the means for adjusting the floating cutter head to the cutting of pipes of different diameters, said means to be used in combination with a selected one of a plurality of interchangeable clamp assemblies; and Figure 7 is an enlarged detail sectional view through the means for transmitting drive from the motor to the cutter mechanism, taken on line 7—7 of Figure 3.

Referring to the drawings in detail, a pipe to be cut has been designated at P, and mounted upon said pipe to travel about the circumference thereof is the pipe-cutting device 10 constituting the present invention.

The pipe cutting device includes a stationary portion, comprising a clamp assembly generally designated 12. The clamp assembly is of annular formation, so as to extend about the full circumference of the pipe, and provides an endless, circular track about which the cutting means of the invention travels for the purpose of forming a circumferentially extending cut in the pipe. The clamp assembly is sectionally constituted, that is, is formed in halves each extending through 180 degrees of a circle. Thus, said clamp assembly includes arcuate bands 114 disposed in end-abutting relation and each extending through 180 degrees of a circle. The bands are of rigid material and are relatively wide as shown in Figure 2, and due to the provision of the two, separably connected bands, the clamp assembly can be placed about a "live line" or string of pipe, permitting cutting of the pipe despite the fact that there is no pipe end near the point at which the pipe is to be cut, onto which end the device would otherwise be capable of being fitted. The device thus has particular adaptability for cutting pipe in pipe lines previously laid, including cross country pipe lines.

The bands 14 are separably connected through the medium of clamp means, the clamp means being arranged to provide a pair of clamps connecting the bands 14 at each end of the bands. Thus, there are two clamps, each generally designated at 17 at one location upon the circumference of the clamp assembly, and two additional clamps 17 at a location diametrically opposite the first location.

The several clamps 17 are identical to one another, so the description of one will suffice for all. Each includes a block 17 secured to one band section 14, and pivoted on said block is an arm 20. A U-shaped keeper 24 has its legs pivotally connected to a shaft provided on the inner end of each arm, eccentrically to the axis of rotation of said shaft, the bight portion of the keeper 24 being adapted to seat in a recess of a block 22 provided upon the adjacent end of the other band section 14.

It will be seen that when the arms 20 are thrown outwardly and upwardly, the keepers 24 will be elevated, so as to disengage from the blocks 22. When, however, the band sections 14 are to be clamped about the pipe, the arms 20 are thrown downwardly to the position shown in Figures 2 and 3, and this causes the keepers to be forced into the recesses of the blocks 22.

Figure 1:
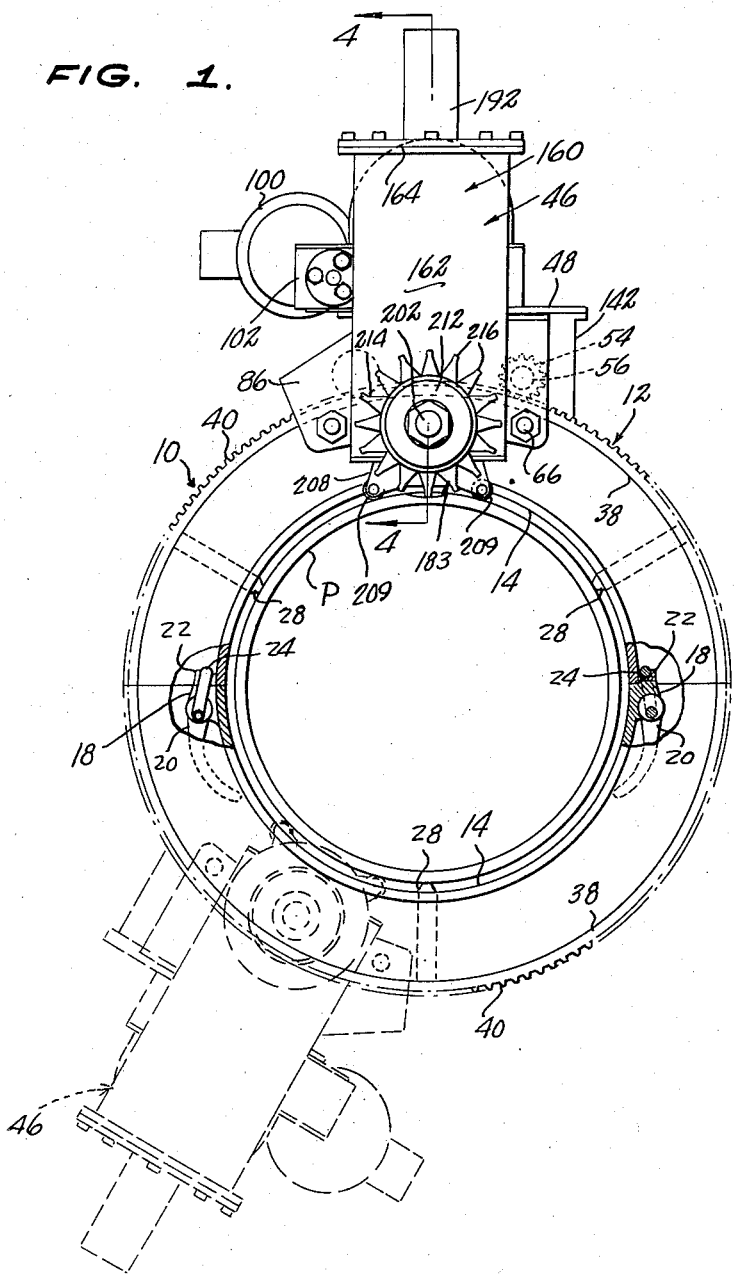
Figure 1 is a front elevational view of a pipe-cutting machine formed according to the present invention, mounted upon a pipe to be cut, the full and dotted lines showing the carriage in different positions as it travels about the pipe circumference.

The band sections are spaced outwardly from the circumference of the pipe, through the provision of the jack screws, and to this end, angularly spaced about each band section are radial, outwardly projecting, threaded sockets 26 (Figures 1 and 2), in which are threadedly engaged jack screws or studs 28 having pointed or tapered inner ends adapted to bear against the pipe circumference. Due to this arrangement, a single clamp assembly is adapted to be fixedly clamped about pipes differing in diameter from one another, in concentric relationship to the associated pipes.

In a commercial embodiment, a number of different clamp assemblies would be provided, having different diameters, with each clamp assembly being adapted to be fitted about pipes falling within a predetermined range of diameters. As will presently appear, usable with any selected clamp assemblies is a self-propelled carriage, capable of being swiftly removed or attached to the selected clamp assembly.

Spaced axially of the sectionally constituted clamping band are flanges 30, 32 (Figure 4) lying in planes normal to the axis of the clamping band. To brace the flanges, there are fixedly connected thereto fins 34, angularly spaced uniform distances apart about the circumference of the clamping band. The fins are recessed as at 36, to provide a clearance for a drive mechanism to be described hereinafter.

Fixedly secured to the sectionally constituted, annular flange 30 is a trackway 38 which, of course, would also be sectionally constituted, that is, a 180-degree length of the trackway 38 would be provided on each band section so that there would be a continuous trackway extending about the full circumference of the clamp assembly when the sections are assembled about a pipe P. The trackway 38 is relatively wide, and has a continuous recess along one side edge thereof (see Figure 4) in which recess is bolted or otherwise fixedly secured a ring gear 40. A continuous ring gear, composed of 180-degree ring gear sections, is thus provided in the assembled condition of the clamp assembly.

On the flange 42 there is fixedly mounted a second guideway also composed of 180 degree sections, each secured to one of the flanges 32 to provide a continuous, annular guideway formed with a guide groove 44 of V-shaped cross section.

This completes the construction of the clamp assembly, and to summarize the same, it may be noted that said assembly is comprised of complementary, 180 degree clamp assembly sections, cooperating to grip a pipe in concentric relation thereto, and provided with axially spaced guideways between which a ring gear is provided.

The carriage has been generally designated at 46, and includes a flat, rectangular base plate 48 (Figure 4) to the underside of which is secured a plate 50 integral with a pair of axially spaced bearing plates 52. A pinion 54 is disposed between the bearing plates 52, and is keyed to a shaft 56 journalled in the bearing plates. Pinion 54 is in mesh with the ring gear 40, and when driven in a manner to be presently described, causes the carriage to travel about the circumference of the clamp assembly, during the cutting of the pipe.

Adjacent the pinion 54, there is secured to a plate 60 an angular, plate-like hanger 58, and connected to the inner surface of the plate 58 is a roller support plate 62, on which is mounted an inner roller 64 freely rotatable upon a stub shaft 66 passing through the plates 58, 62 and held in place by a nut or equivalent means.

An outer roller 68 is mounted on a stub shaft carried by a block slidable upon the plate 62 in a direction radially of the clamp assembly. Swiveled on said block is a stud 72, threadedly engaged in a nut 70 that is slidably mounted on the plate 62. By reason of this arrangement, it will be seen that when the stud 72 is turned in one direction, the roller 68 will be shifted in a radial direction toward or away from the roller 64. On turning of the stud 72 in an opposite direction, roller 68 is shifted away from the roller 64. In this way, the rollers are adjustable with respect to one another into engagement with the outer and inner surfaces of the annular guideway 38.

To support the carriage at its other end upon the guideway or track 42 there is provided a removable roller support assembly including a roller hanger 74 carrying an inner roller 76 rotatably mounted upon a roller support plate connected to the hanger 74 by a bolt or screw 78 (Figure 4). Also carried by the hanger 74 is a yoke 80 between the arms of which is rotatably mounted a roller 82 the periphery of which is shaped to complement the V-shaped groove 44.

It will be seen that through the medium of the pinion 54 and the several rollers, the carriage is rollably mounted upon the annular clamp assembly, to travel about the full circumference thereof, with the travel being effected by rotation of the pinion 54 in a manner to be made presently apparent. In this connection, the hangers 58, 74 are readily removable from the base plate 48 of the carriage, to free the carriage from engagement with the annular clamp assembly. Therefore, whenever it is desired to use the carriage with a particular clamp assembly, it is merely necessary to attach the same thereto through the medium of a removable roller means 64, 68, 76, 80, the removal and attachment of the roller means being effected through the medium of bolts 83, 85.

In addition to the roller means hereinbefore described, there is provided a roller means at the opposite side of the carriage shown in Figure 3. This includes a plate 84 fixedly connected to a plate 75 that is fixedly attached to the base plate 48. Plate 84 is detachably connectable to a roller hanger 86, having a stub shaft 88 on which is rotatably mounted a roller 90. To adjustably limit the medium of rotation of the stub shaft 88, there is provided a plate 92 against which bears screws 94 threaded in the plate 84. The plate 92 would be formed with a slot receiving the shaft 88, so that it could bind against the shaft 88 to a selected degree. Guiding the plate 92 in its movement into and out of binding engagement with the plate 88 is a short slot 98, receiving a screw 96 carried by the plate 92 (Figure 3).

Referring now to Figure 4, means is provided for adjusting the hanger 74 in a direction axially of the clamp assembly. To this end, a plate 75 is fixedly secured to the base plate 48, and fixedly mounted upon the plate 75 is a bracket 77 projecting outwardly, and threaded to receive a stud 79 threadedly engaged in an end wall 81 of the base plate 48.

A motor has been designated at 100, and is mounted at one side of the carriage. In the illustrated example, an electric motor is shown. However, the motor can be a hydraulically actuated motor, an air motor, etc.

In any event, the shaft of the motor is adapted to drive gears within a gear box 102 mounted upon the side of the carriage housing (see Figures 3 and 7). A geared connection would be provided between the motor shaft and a shaft 104 extending into the gear box 102. Keyed to the shaft 104 is a pinion 106 in mesh with a gear 108 in turn meshing with a large diameter gear 110 turning in the casing 112 of the carriage, said casing having a removable cover 114 formed with an enlarged portion 116 to accommodate the gear 110.

Gear 110 is keyed to a shaft 118 extending axially of the casing, said shaft being journalled in a bearing 120 and disc 122 spaced longitudinally of the casing as shown in Figure 4.

Provided on shaft 118 is a beveled gear 124 secured to a sleeve 125 freely rotatable on the shaft 118. Spaced from beveled gear 124 is a second beveled gear 126 secured to a sleeve 128 also free on shaft 118. Shaft 118 is in a bearing 130 carried by the base of the carriage. Clutch teeth are provided on sleeves 125, 128. Gears 124, 126 mesh with a bevel gear 132, which, as shown in Figure 3, is keyed to a shaft 134 disposed radially of the clamp assembly. Shaft 134 has secured thereto a worm 136, and adjacent the worm, the shaft 134 is journalled in bearing 138. The worm 136 is in mesh with a gear 140, rotating in a housing 142 that extends into the recesses 36 of the fins 34.

Gear 140 is keyed to the pinion shaft 56. Accordingly, on operation of the motor gear 140 will rotate, causing rotation of the pinion, at a predetermined rate of speed, so that the carriage moves slowly throughout the circumference of the pipe P, with said travel of the carriage continuing until the pipe has been fully severed.

For the purpose of driving the carriage either forwardly or in reverse a keyway 144 is provided in shaft 118 between the beveled gears 124, 126 (Figure 4). This receives a key of a dog clutch 145. A clutch shifting disc 146 is freely rotatable upon the clutch 145. The clutch shifting disc 146 is disposed between collars 147 rigid with the clutch. A rock shaft 148 (Figure 3) has a cranked or axially offset inner end 150 engaged loosely in the disc 146. The rock shaft 148 is journaled in a bearing 149 carried by the casing, and secured fixedly to the outer end of the rock shaft is a handle 152. Extending through the handle is a detent 154 spring biased into any one of a plurality of openings 155 arranged in an arcuate series upon a plate 157 fixedly secured to the side wall of the casing.

It will be seen that the detent normally locks the rock shaft against rotation so as to hold the disc 146 in a selected position. If the detent is engaged in the middle one of the openings 155, the disc 146 will be in neutral, out of engagement with either of the sleeves 125, 128. However, by pulling back on the detent 154, the handle 152 is free to swing, and when swung rocks the shaft 148 so that the cranked end 150 will shift the disc 146 either to the left or right.

This will cause the disc 146 to be engaged against a selected collar 147, thus shifting the clutch into engagement with one or the other gear sleeve, for driving the carriage about the pipe in a selected direction.

A second clutch assembly, generally designated at 158, is spaced longitudinally of the carriage from the first assembly as shown in Figure 2. This includes a clutch shifting disc or ring 156 shiftable into engagement with either one of a pair of collars 159, 161 (Figure 4) carried by a sleeve splined or keyed on shaft 118. The disc 156 is adapted to shift the sleeve into and out of a position in which it drivingly engages with teeth 157 or disc 122.

A cutter head assembly has been generally designated at 160, and is mounted upon the front end of the casing. Assembly 160 is extended radially of the apparatus, and includes a cylindrical housing 162 closed at its outer end by a removable collar 164. A bevel gear 166 within housing 162 is secured to disc 122 so as to be driven from the motor 100 when clutch 158 is engaged and is in mesh with a bevel gear 168 through which extends a shaft 170 disposed axially of housing 162. Shaft 170 has a spline groove 172, receiving a key or spline 173 engageable in a spline groove of gear 168. Thus, gear 168 and shaft 170 are relatively shiftable in an axial direction, while being connected for joint rotation by the spline rib 173.

The gear 168 is held against axial movement in one direction by the gear 166, and against axial movement in the opposite direction by a plate 174 disposed transversely of the housing 162 and secured fixedly to a shoulder 176 extending within the housing through the full circumference thereof. Plate 174 is cupped to receive the hub of gear 168, and bearing against the plate 174 is one end of a compression coil spring 178 the other end of which bears against an oppositely cupped plate 180 connected to an internal shoulder 181 of the housing 162.

Secured to the shaft 173 for rotation therewith, and bearing in the cupped central portion of the plate 180, is a bevel gear 182.

The plate 180 is part of a floating cutter head generally designated 183. The cutter head 183 is freely slidable axially of the housing 162. Referring to Figure 5, guiding of the cutter head during its axial movement is effected through a medium of a pair of guide rods 184 connected to diametrically opposite portions of the plate 180. The guide rods 184 are connected to a cross head 186 having limited up and down sliding movement upon a stud 188 extending through a center opening of the cover 164. The stud 188 is adjustable axially through the provision of a nut 190 threadedly engaged therewith and bearing against the cover 164. Enclosing the stud is a cylindrical cover 192.

It will be noted that the plate 180 is connected to the shoulder 181, which is formed on the inner surface of a cylindrical member 193 sliding upon the housing 162.

To hold the cover in place, there is provided a projection 194 thereon, against which bears a leaf spring 196, through which passes a screw 198 threaded into the cover 164.

Meshing with the gear 182 is a bevel gear 200, keyed to a shaft 202 extending normally to the length of the shaft 170, and journalled at one end in an axial recess provided in a pin 204 threadedly engaged in an opening of the member 193. The pin extends through an opening formed in an eccentric is itself rotatable within a large opening formed in a plate 208 carrying plate-engaging rollers 209. Radial markings 207 are provided upon the eccentric as an indexing means.

The eccentric can be rotated about the pin 204, and the plate 208 is rotated about the eccentric to dispose the rollers 209 where they will engage the pipe P in any position to which the eccentric is turned. The plate 208 is locked to the eccentric in selected positions of rotatable adjustment of the eccentric upon the pin and of rotatable adjustment of the plate relative to the eccentric, through the medium of a detent 218 axially shiftable within a detent housing 219 of the plate 208. A compression coil spring 220 biases the detent 218 inwardly, to cause the same to releasably engage in a selected one of a plurality of peripheral notches 222 provided in the eccentric in registration with the several indicia 207.

By reason of this arrangement, the depth to which the cutter means of the device can penetrate the pipe is adjustably limited, since the cutter means is turned by the shaft 202 and since the distance between the points at which rollers 209 contact pipe P, and the axis of shaft 202, can be varied by selective positioning of the eccentric and of the plate 208.

The cutter means includes a bushing 210 threadedly engaged in the member 183. The shaft 202 is journalled in said bushing. Exteriorly of the member 193, secured to the shaft 202 for rotation therewith is a star wheel cutter 212, having tapered teeth 214 terminating at their outer ends in hardened cutter discs 216.

Due to the arrangement illustrated, it will be seen that the floating cutter head 183 will be continuously biased in a direction radially, inwardly of the pipe being cut, by the spring 178. Therefore, as the star wheel cutter penetrates the work, the floating cutter head will be continuously moved radially inwardly, to cause a progressive deepening of the cut made as the carriage continues to travel around the pipe.

Each time the carriage makes a full revolution, the cut will be little deeper, with the floating head being continuously biased inwardly to cause, eventually, the full severing of the pipe.

The limit that the pipe can be cut, of course, is determined by the eccentric and the plate 208, as previously described herein, and further, this portion of the floating cutter head, riding upon the pipe, prevents the spring from suddenly expanding when the pipe is fully cut.

Summarizing the construction and operational characteristics of the device briefly, it may be noted that there is provided a sectionally constituted combination clamp assembly and trackway, girdling the pipe to be cut. Said assembly can be attached to "live lines," and is designed to be interchangeable with other clamp assemblies of different diameters. The clamp assembly includes a ring gear, and a carriage is removably and rollably supported upon the clamp assembly, with said carriage being self-propelled to continuously travel about the pipe. The carriage includes a pinion in mesh with the ring gear, and also includes the motor carried by the carriage to drive said ring gear to cause the movement of the carriage about the pipe. At the same time, drive mechanism is provided for a floating cutter head of the assembly, that is spring-biased radially, inwardly of the pipe being cut to an adjusted extent, so as to effect the severing of the pipe responsive to rotation of the carriage about the work.

It is believed apparent that the invention is not necessarily confined to the specific use or uses thereof described above, since it may be utilized for any purpose to which it may be suited. Nor is the invention to be necessarily limited to the specific construction illustrated and

What is claimed is:

1. A pipe cutting machine comprising: an annular, pipe-encircling clamp assembly including a trackway; a carriage supported on the trackway for travel about the clamp assembly; a cutter head mounted on the carriage for travel radially inwardly of the clamp assembly in a straight path perpendicular to the axis about which said carriage travels about said assembly; a ring gear stationarily mounted on and extending circumferentially of said assembly in parallel relation to the trackway; a drive pinion rotatably mounted upon the carriage in mesh with the ring gear; a cutting wheel rotatably mounted upon the cutter head on an axis always parallel to the first named axis and moving therewith radially inwardly of the clamp assembly while rotating on the cutter head and traveling with the cutter head and carriage about the clamp assembly; a prime mover on the carriage; driving connections extending from the prime mover to the pinion and cutter wheel respectively; and resilient, yielding means interposed between the carriage and cutter head and tensioned to maintain a constant pressure on the cutter head in a direction radially inwardly of the clamp assembly for biasing the cutter head in said path, said driving connection between the prime mover and cutter wheel extending itself concurrently with shifting of the cutter wheel radially inwardly of the clamp assembly to maintain a driving-driven relationship between the prime mover and cutter wheel.

2. A pipe cutting machine comprising: an annular, pipe-encircling clamp assembly including a trackway; a carriage supported on the trackway for travel about the clamp assembly; a cutter head mounted on the carriage for travel radially inwardly of the clamp assembly in a straight path perpendicular to the axis about which said carriage travels about said assembly; a ring gear stationarily mounted on and extending circumferentially of said assembly in parallel relation to the trackway; a drive pinion rotatably mounted upon the carriage in mesh with the ring gear; a cutting wheel rotatably mounted upon the cutter head on an axis always parallel to the first named axis and moving therewith radially inwardly of the clamp assembly while rotating on the cutter head and traveling with the cutter head and carriage about the clamp assembly; a prime mover on the carriage; driving connections extending from the prime mover to the pinion and cutter wheel respectively; and resilient, yielding means interposed between the carriage and cutter head and tensioned to maintain a constant pressure on the cutter head in a direction radially inwardly of the clamp assembly for biasing the cutter head in said path, said driving connection between the prime mover and cutter wheel including a drive gear on the carriage, a driving linkage extending from the prime mover to said drive gear for rotating the drive gear, a shaft splined to the drive gear so as to be axially shiftable therein while rotating therewith, and meshing gears rotatable with the shaft and cutter wheel respectively, said shaft and the last named meshing gears being carried by the cutter head to travel therewith radially inwardly of the clamp assembly.

3. A pipe cutting machine comprising: an annular, pipe-encircling clamp assembly including a trackway; a carriage supported on the trackway for travel about the clamp assembly; a cutter head mounted on the carriage for travel radially inwardly of the clamp assembly in a straight path perpendicular to the axis about which said carriage travels about said assembly; a ring gear stationarily mounted on and extending circumferentially of said assembly in parallel relation to the trackway; a drive pinion rotatably mounted upon the carriage in mesh with the ring gear; a cutting wheel rotatably mounted upon the cutter head on an axis always parallel to the first named axis and moving therewith radially inwardly of the clamp assembly while rotating on the cutter head and traveling with the cutter head and carriage about the clamp assembly; a prime mover on the carriage; driving connections extending from the prime mover to the pinion and cutter wheel respectively; and resilient, yielding means interposed between the carriage and cutter head and tensioned to maintain a constant pressure on the cutter head in a direction radially inwardly of the clamp assembly for biasing the cutter head in said path, said driving connection between the prime mover and cutter wheel including a drive gear on the carriage, a driving linkage extending from the prime mover to said drive gear for rotating the drive gear, a shaft splined to the drive gear so as to be axially shiftable therein while rotating therewith, and meshing gears rotatable with the shaft and cutter wheel respectively, said shaft and the last named meshing gears being carried by the cutter head to travel therewith radially inwardly of the clamp assembly, said resilient, yielding means comprising a compression, coil spring circumposed about the shaft and abutting at its opposite ends against the carriage and cutter head respectively.

4. A pipe cutting machine comprising: an annular, pipe-encircling clamp assembly including a trackway; a carriage supported on the trackway for travel about the clamp assembly; a cutter head mounted on the carriage for travel radially inwardly of the clamp assembly in a straight path perpendicular to the axis about which said carriage travels about said assembly; a ring gear stationarily mounted on and extending circumferentially of said assembly in parallel relation to the trackway; a drive pinion rotatably mounted upon the carriage in mesh with the ring gear; a cutting wheel rotatably mounted upon the cutter head on an axis always parallel to the first named axis and moving therewith radially inwardly of the clamp assembly while rotating on the cutter head and traveling with the cutter head and carriage about the clamp assembly; a prime mover on the carriage; driving connections extending from the prime mover to the pinion and cutter wheel respectively; and resilient, yielding means interposed between the carriage and cutter head and tensioned to maintain a constant pressure on the cutter head in a direction radially inwardly of the clamp assembly for biasing the cutter head in said path, said driving connection between the prime mover and cutter wheel including a drive gear on the carriage, a driving linkage extending from the prime mover to said drive gear for rotating the drive gear, a shaft splined to the drive gear so as to be axially shiftable therein while rotating therewith, and meshing gears rotatable with the shaft and cutter wheel respectively, said shaft and the last named meshing gears being carried by the cutter head to travel therewith radially inwardly of the clamp assembly, said resilient, yielding means comprising a compression coil spring circumposed about the shaft and abutting at its opposite ends against the carriage and cutter head respectively, the cutter head including a plate on which is rotatably supported one of the last named gears that rotates with the shaft, the cutter head further including guide rods connected to said plate and slidably engaged in the carriage for sliding movement in said path, and a cylindrical member connected to said plate, the carriage including a cylindrical housing in which said member is axially slidable in said path.

References Cited in the file of this patent

UNITED STATES PATENTS

| | | |
|---|---|---|
| 802,215 | Johnson | Oct. 17, 1905 |
| 1,406,047 | Mikshel | Feb. 7, 1922 |
| 1,986,413 | Ruemllin | Jan. 1, 1935 |
| 2,291,395 | Levey | July 28, 1942 |
| 2,561,484 | Shaw et al. | July 24, 1951 |
| 2,660,128 | Hayes | Nov. 24, 1953 |
| 2,790,496 | Marsden | Apr. 30, 1957 |